United States Patent
Jung

(10) Patent No.: US 7,286,608 B2
(45) Date of Patent: Oct. 23, 2007

(54) APPARATUS AND METHOD FOR TRANSMITTING SIGNAL BASED ON INTERLEAVING DELAY DIVERSITY

(75) Inventor: Suk-Hyen Jung, Seoul (KR)

(73) Assignee: Pantech Co., Ltd., Seoul (KR)

( * ) Notice: Subject to any disclaimer, the term of this patent is extended or adjusted under 35 U.S.C. 154(b) by 690 days.

(21) Appl. No.: 10/735,508

(22) Filed: Dec. 11, 2003

(65) Prior Publication Data

US 2004/0213330 A1  Oct. 28, 2004

(30) Foreign Application Priority Data

Apr. 25, 2003 (KR) ............. 10-2003-0026412

(51) Int. Cl.
*H04B 7/02* (2006.01)
*H04L 1/02* (2006.01)

(52) U.S. Cl. .................. 375/267; 375/296

(58) Field of Classification Search ........... 375/267, 375/347, 295, 315, 278, 296, 348; 370/278, 370/282

See application file for complete search history.

(56) References Cited

U.S. PATENT DOCUMENTS

| | | | |
|---|---|---|---|
| 5,787,122 A * | 7/1998 | Suzuki | 375/267 |
| 2004/0181744 A1* | 9/2004 | Sindhushayana | 714/794 |
| 2004/0202138 A1* | 10/2004 | Song et al. | 370/335 |

FOREIGN PATENT DOCUMENTS

| | | |
|---|---|---|
| KR | 2003-10402 | 2/2003 |
| KR | 10-2004-0031521 A | 4/2004 |
| WO | WO 98/56122 | 12/1998 |
| WO | WO 99/12274 | 3/1999 |
| WO | WO 00/64073 | 10/2000 |
| WO | WO 02/19565 | 3/2002 |

OTHER PUBLICATIONS

Sookhyun Jung, "A study on Interleaving Delay Diversity Technology in WCDMA System" 2003.

* cited by examiner

*Primary Examiner*—Khai Tran
(74) *Attorney, Agent, or Firm*—Knobbe Martens Olson & Bear LLP

(57) ABSTRACT

Provided is an apparatus and method for transmitting a signal based on interleaving delay diversity. The transmitting apparatus includes: a converting unit for converting an input data into a plurality of low data rate bit streams; a modulation unit for modulating the plurality of the low data rate bit streams by using Walsh codes, to thereby generate modulated signals; an adder for adding the modulated signals to generate a summation signal; a dividing unit for dividing the summation signal into at least two branch signals; a signal processing unit for generating a first output signal by interleaving one branch signal to generate an interleaved signal and multiplying the interleaved signal with a first code, and generating a second output signal by multiplying another branch by a second code; and a transmission unit for transmitting the first output signal and the second output signal, wherein the first code and the second code are orthogonal to the Walsh codes.

10 Claims, 15 Drawing Sheets

APPARATUS AND METHOD FOR TRANSMITTING SIGNAL BASED ON INTERLEAVING DELAY DIVERSITY

BACKGROUND OF THE INVENTION

1. Field of the Invention

The present invention relates to an apparatus and method for transmitting a signal based on interleaving delay diversity; and, more particularly, to an apparatus and method for transmitting a signal based on interleaving delay diversity which supports high data rate transmission by using a multi-code transmission system.

2. Description of Related Art

While existing mobile communication systems provide voice-based service, a third-generation mobile communication system, which is under active development, supports multimedia service. To provide the multimedia service, the capacity of the mobile communication system should be expanded greatly. Therefore, a diversity technology that can expand system capacity without additional bandwidth increase is studied actively.

Diversity includes space diversity, angle diversity, polarization diversity, field diversity, frequency diversity, multi-path diversity and time diversity. The space diversity can be acquired by using a plurality of transmission antennas or a plurality of reception antennas. The space between the antennas should be enough for each diversity branch to have uncorrelated fading.

This is hard to be achieved when the size of the receiver is small. Also, the signals can hardly be received at the same intensity, and the cost and power supply for a mobile terminal are problematic, too. Therefore, it is desirable and economical to apply the space diversity to a base station with less complexity and sufficient space for installing a plurality of antennas.

The angle diversity can be acquired by selecting a plane wave so that the directional antennas should have uncorrelated fading. The field diversity can be acquired by using a certain point in which elements of electric field and magnetic field are uncorrelated. The frequency diversity uses a plurality of channels that are apart more than a coherent bandwidth from each other. The multi-path diversity can be acquired by separating signals transmitted through a rake receiver with different time delay. The time diversity can be acquired by sending out identical signals at several time slots.

FIG. 1 is a block diagram illustrating a conventional multi-code transmitter. The multi-code transmitter includes a converting unit 110, a modulation unit 120, an adder 130, and a multiplication unit 140. The converting unit 110 converts an input data bit having a bit length of $T_b$ in parallel into a plurality of sub-channels of low data rate bit streams. The modulation unit 120 modulates the low data rate bit streams from the converting unit 110 by using a Walsh code according to each sub-channel. The adder 130 receives the modulated data from the modulation unit 120 and adds the modulated data. The multiplication unit 140 applies a pseudo-noise (PN) code to an output signal of the adder 130.

Hereafter, the operation of a conventional multi-code transmitter will be described. The bit streams from the converting unit 110 have a symbol length of $T=KT_b$. Due to the increase in the symbol length in each sub-channel, the system performance becomes less sensitive to multi-path delay spread.

Subsequently, sub-channels are obtained by modulation in the modulation unit 120 and discriminated. By doing so, multi-path interference can be decreased. Also, processing gain (N) is adjusted properly so that the bandwidth required for data stream after modulation could be the same as the bandwidth of the original high rate data stream. A binary data signal and a Walsh code in a k_th sub-channel are expressed as follows:

$$b_k(t) = \sum_{i=\infty}^{\infty} b_i^k p_t((i-1)T, iT) \quad \text{Equation 1}$$

$$W_k(t) = \sum_{i=1}^{N} W_i^k p_t((i-1)T_c, iT_c) \quad \text{Equation 2}$$

T denotes a symbol length; $P_t(t_1,t_2)$ denotes a unit rectangular pulse in a time slot $[t_1,t_2]$; and $T_c$ denotes a chip length.

Also, $b_i^k$ and/or $W_i^k$ is 1 or −1 and/or their probability for having each value is the same, i.e., ½. The PN code can be expressed as Equation 3:

$$PN(t) = \sum_{i=1}^{K} PN_i p_t((i-1)T_c, iT_c) \quad \text{Equation 3}$$

$PN_i$ is 1 or −1 and $PN_i$ equals to $PN_{i+N}$ with respect to all i values ($PN_i = PN_{i+N}$). The chip length $T_c$ has a value of T/N. A transmission signal of the mobile communication system can be expressed as Equation 4:

$$S(t) = \sum_{k=1}^{K} \sqrt{2P}\, b_k(t) W_k(t) PN(t) \cos(\omega_c, t) \quad \text{Equation 4}$$

P denotes power consumed for transmitting a signal.

When a channel through which the transmission signal passes is $$h(t) = \sum_{l=1}^{L} \beta \delta(t - \tau_l) e^{j\gamma_l},$$

a signal received in a receiver is expressed as Equation 5:

$$y(t) = \sum_{k=1}^{K} \sum_{l=1}^{L} \sqrt{2P}\, \beta_l b_k(t-\tau) W_k(t-\tau) \quad \text{Equation 5}$$

$$PN(t-\tau) \cos(\omega_c t + \gamma_l) + n(t)$$

$\beta_l$ denotes a channel coefficient; $\tau$ denotes a channel time delay; $\gamma_l$ denotes a phase shift; L denotes the number of multi-paths; and n(t) denotes white Gaussian noise having double sided power spectral density.

When it is assumed that the time delay and phase of a carrier can be restored completely in the receiver, an output of a correlator of the receiver can be expressed as Equation 6.

$$Z_i = \int_i^{T+\tau} y(t) W_k(t-\tau_i) PN(t-\tau_i) \cos(\omega_c t + r_i) dt \quad \text{Equation 6}$$

However, the conventional multi-code transmitter, which is described above, requires additional parallel codes as data rate is increased, thus increasing the amount of data processing and complexity.

SUMMARY OF THE INVENTION

One aspect of the present invention provides an apparatus for processing and transmitting a signal. The apparatus comprises: a splitter configured to split an input signal into two or more signals may comprise a first signal and a second signal; an interleaver configured to interleave the first signal to provide a first interleaved signal; a first multiplier configured to multiply the first interleaved signal with a first code to provide a first coded signal; a second multiplier configured to multiply the second signal with a second code to provide a second coded signal; and a transmission unit configured to transmit the first coded signal and the second coded signal.

The above-described apparatus may further comprise a delay configured to delay the second coded signal to provide a time-delayed second coded signal, wherein the transmission unit may be configured to transmit the time-delayed second coded signal in lieu of the second coded signal. In the apparatus, the first and second signals may be identical. The apparatus may further comprise: a converter configured to convert an input data into a plurality of bit streams; a modulator configured to modulate the plurality of bit streams to provide modulated signals; and an adder configured to add the modulated signals and provide the summed signal as the input signal to the splitter. The modulator may be configured to modulate each of the plurality of bit streams in conjunction with a Walsh code. At least one of the first and second codes may be orthognal to a code with which at least one of the plurality of bit streams may be modulated. The second code may be a Gold code. The transmission unit comprises one or more antennas, and wherein the first coded signal and the second coded signal may be configured to be transmitted through a single antenna. The apparatus may further comprise an antenna selector configured to select the single antenna from the one or more antennas. The transmission unit may comprise at least one antenna, and wherein the transmission unit may be configured to transmit the first coded signal and the second coded signal through the at least one antenna. At least one of the first and second codes may be orthognal to a code with which the input signal is pre-modulated.

In the above-described apparatus, the two or more signals may further comprise a third signal, wherein the apparatus further comprises a third multiplier configured to multiply the third signal to provide a third coded signal, and wherein the transmission unit may be further configured to transmit the third coded signal. The apparatus may further comprise: a second delay configured to delay the second coded signal to provide a time-delayed second coded signal; a third delay configured to delay the third coded signal to provide a time-delayed third coded signal; and wherein the transmission unit may be configured to transmit the time-delayed second and third coded signals in lieu of the second and third coded signals, respectively. The second delay may be configured to delay the second coded signal for a second delay period, wherein the third delay may be configured to delay the third coded signal for a third delay period, and wherein the second and third delay periods may be different from each other. The apparatus may comprise a mobile phone.

Another aspect of the present invention provides an apparatus for processing and transmitting a signal. The apparatus comprises: means for splitting an input signal into two or more signals may comprise a first signal and a second signal; means for interleaving the first signal to provide a first interleaved signal; means for multiplying the first interleaved signal with a first code to provide a first coded signal; means for multiplying the second signal with a second code to provide a second coded signal; and means for transmitting the first coded signal and the second coded signal.

Another aspect of the present invention provides a method for processing and transmitting a signal. The method comprises: splitting an input signal into two or more signals may comprise a first signal and a second signal; interleaving the first signal to provide a first interleaved signal; multiplying the first interleaved signal with a first code to provide a first coded signal; multiplying the second signal with a second code to provide a second coded signal; and transmitting the first coded signal and the second coded signal. The method may further comprise delaying the second coded signal to provide a time-delayed second coded signal, wherein the time-delayed second coded signal may be transmitted in lieu of the second coded signal.

The above-described method may further comprise: converting an input data into a plurality of bit streams; modulating the plurality of bit streams to provide modulated signals; and adding the modulated signals and provide the summed signal as the input signal for the splitting. The modulation of at least one of the plurality of bit streams may be carried out in conjunction with a Walsh code. At least one of the first and second codes may be orthognal to a code with which at least one of the plurality of bit streams may be modulated. The second code may be a Gold code. The first coded signal and the second coded signal may be transmitted through a single antenna. The method may further comprise selecting an antenna among two or more antennas to transmit the first coded signal and the second coded signal through.

In the above-described method, the two or more signals may further comprise a third signal, wherein the method may further comprises: multiplying the third signal to provide a third coded signal; and transmitting the third coded signal. The first, second and third coded signals may be transmitted through a single antenna. The first, second and third coded signals may be transmitted through different antennas. The method may further comprise: delaying the second coded signal for a second delay period to provide a time-delayed second coded signal; delaying the third coded signal for a third delay period to provide a time-delayed third coded signal; and wherein the time-delayed second and third coded signals may be transmitted in lieu of the second and second coded signals, respectively. The second delay period and the third delay period may be different from each other. The input signal may be originated from a voice.

Still another aspect of the present invention provides one or more processor readable storage devices having processor readable code embodied on the processor readable storage devices, the processor readable code for programming one or more processors to perform a method for processing and transmitting a signal. The method comprises: splitting an input signal into two or more signals may comprise a first signal and a second signal; interleaving the first signal to provide a first interleaved signal; multiplying the first interleaved signal with a first code to provide a first coded signal; multiplying the second signal with a second code to provide a second coded signal; and transmitting the first coded signal and the second coded signal.

Still another aspect of the present invention provides an apparatus for transmitting a signal based on interleaving delay diversity that can expand system capacity and improve communication quality by applying interleaving technique to delay transmission diversity. Also, the apparatus can acquire reception diversity gain according to retransmission by performing retransmission process several times at a transmission unit and enhance communication efficiency by selecting an antenna having the most appropriate channel environment based on downlink information.

In accordance with an aspect of the present invention, there is provided an apparatus for transmitting a signal based on interleaving delay diversity, including: a converting unit for converting an input data into a plurality of low data rate bit streams; a modulation unit for modulating the plurality of the low data rate bit streams by using Walsh codes, to thereby generate modulated signals; an adder for adding the modulated signals to generate a summation signal; a dividing unit for dividing the summation signal into at least two branch signals; a signal processing unit for generating a first output signal by interleaving one branch signal to generate an interleaved signal and multiplying the interleaved signal with a first code, and generating a second output signal by multiplying another branch by a second code; and a transmission unit having a plurality of antennas, for transmitting the first output signal and the second output signal through one of the antennas, wherein the first code and the second code are orthogonal to the Walsh codes.

In accordance with another aspect of the present invention, there is provided a method for transmitting a signal based on interleaving delay diversity, including the steps of: a) converting an input data into a plurality of low data rate bit streams; b) modulating the plurality of the low data rate bit streams by using Walsh codes, to thereby generate modulated signals; c) adding the modulated signals to generate a summation signal; d) dividing the summation signal into at least two branch signals; e) generating a first output signal by interleaving one branch signal to generate an interleaved signal and multiplying the interleaved signal with a first code, and generating a second output signal by multiplying another branch by a second code; and f) selecting one of multiple antennas and transmitting the first output signal and the second output signal through the selected antenna, wherein the first code and the second code are orthogonal to the Walsh codes.

BRIEF DESCRIPTION OF THE DRAWINGS

The above and other objects and features of the present invention will become apparent from the following description of the preferred embodiments given in conjunction with the accompanying drawings, in which:

FIGS. 3A to 3M are graphs analyzing performance of the transmitter using interleaving delay diversity in accordance with the embodiment of the present invention.

DETAILED DESCRIPTION OF THE INVENTION

Other objects and aspects of the invention will become apparent from the following description of the embodiments with reference to the accompanying drawings, which is set forth hereinafter.

Figure 1:
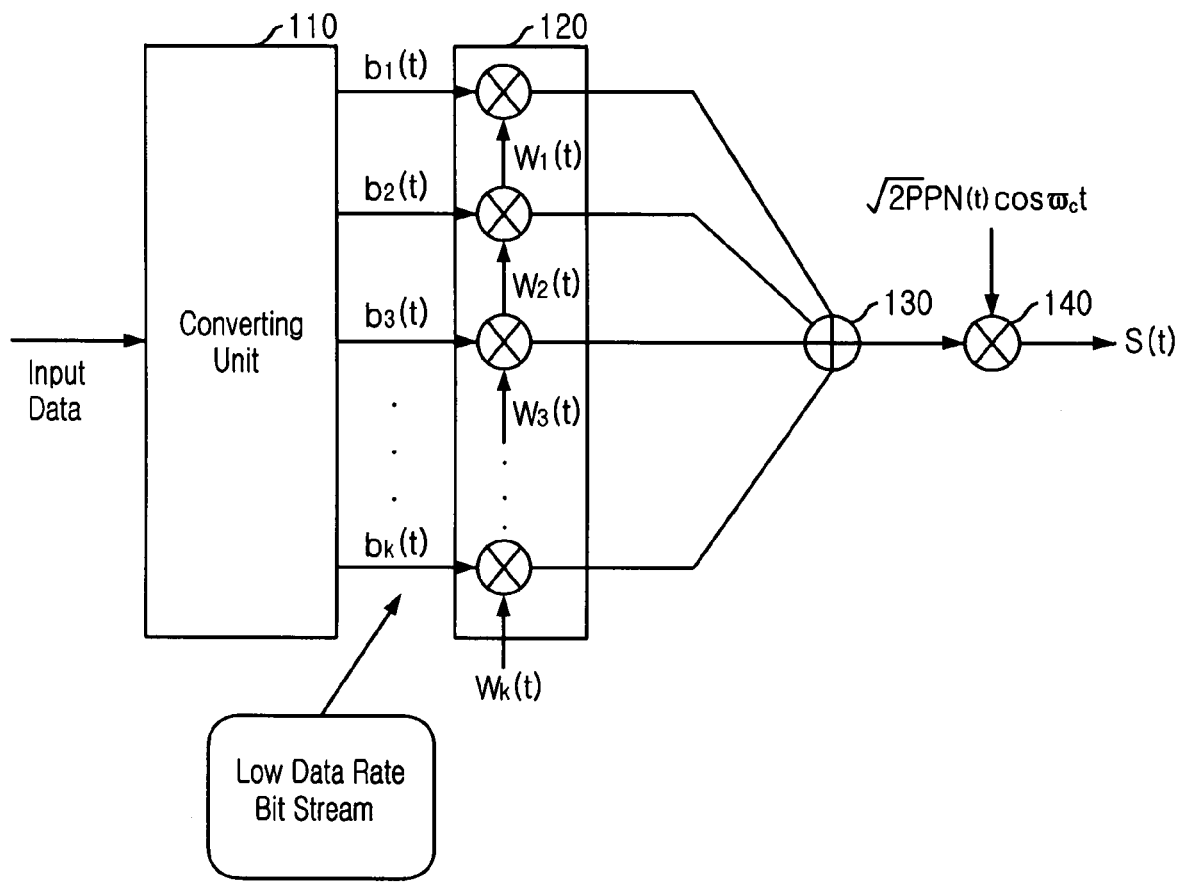
FIG. 1 is a block diagram illustrating a conventional multi-code transmitter.
Figure 2:
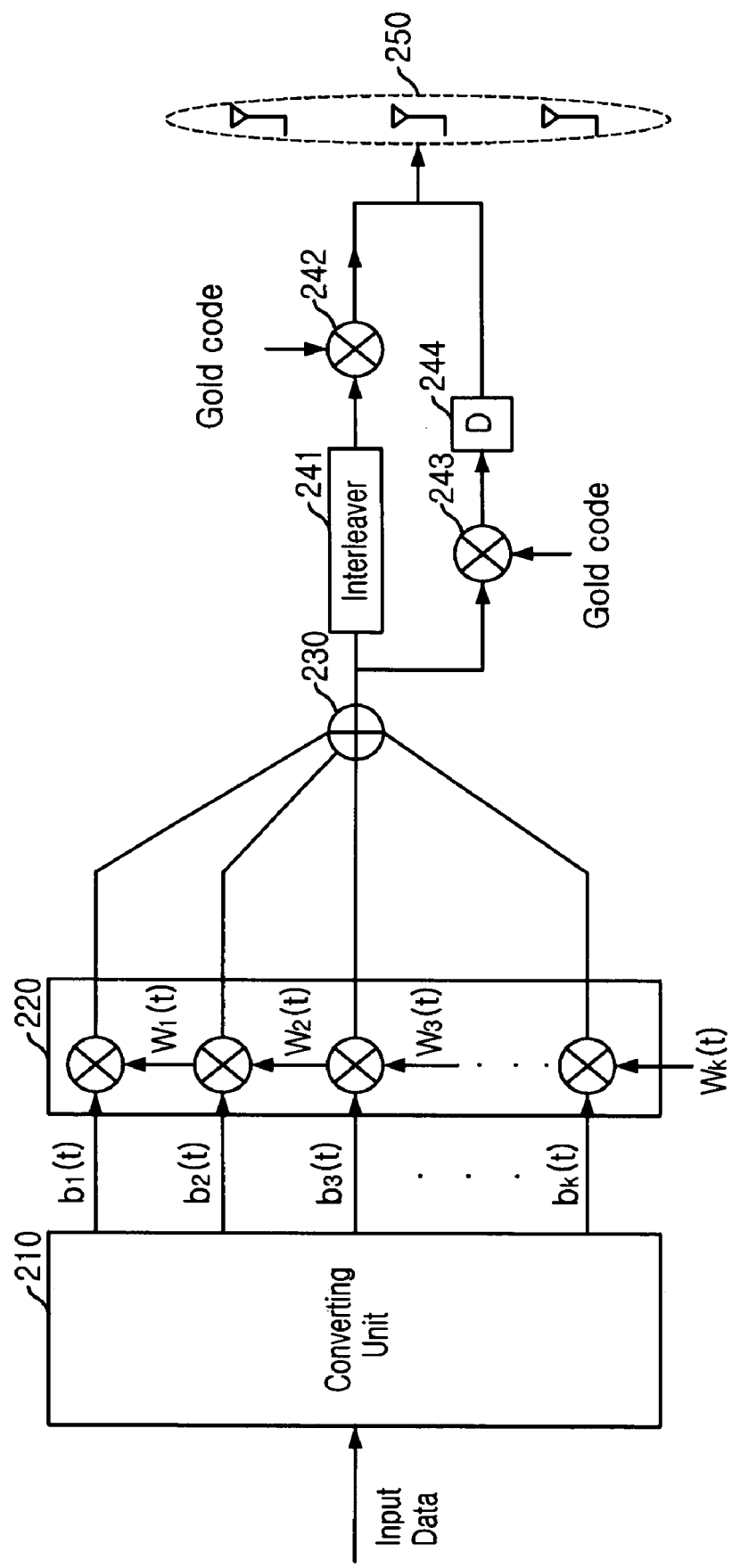
FIG. 2 is a block diagram describing a transmitter using interleaving delay diversity in accordance with an embodiment of the present invention.

FIG. 2 is a block diagram describing a transmitter using interleaving delay diversity in accordance with an embodiment of the present invention. The transmitter using interleaving delay diversity includes: a converting unit 210, a modulation unit 220, an adder 230, a divider 235, an interleaver 241, a first multiplier 242, a second multiplier 243, a delay unit 244, and a transmission unit 250.

The converting unit 210 converts an input data bit having a bit length of $T_b$ into K low data rate bit streams in parallel. The modulation unit 220 receives and modulates the K low data rate bit streams at each sub-channel by using a Walsh code.

The adder 230 receives the modulated data at multiple sub-channels from the modulation unit 220, adds them up to generate summation data. The divider 235 divides the summation data received from the adder 230 into a plurality of branches. The interleaver 241 receives one branch of the summation data from the adder 230 and performs interleaving of the summation data to generate an interleaved signal.

The first multiplier 242 multiplies the interleaved signal from the interleaver 241 and a gold code and outputs a first resultant signal. The second multiplier 243 receives another branch from the adder 230 and multiplies it to a gold code and outputs a second resultant signal.

The delay unit 244 receives and delays the second resultant signal outputted from the second multiplier 243, and outputs a delayed resultant signal. The transmission unit 250 includes a plurality of antennas to transmit the first and second resultant signals. It selects a transmission antenna having the most appropriate channel based on downlink information, transmits the first resultant signal received from the first multiplier 242, and then transmits the delayed resultant signal received from the delay unit 244.

Hereafter, the operation of a transmitter using interleaving delay diversity will be described. First, an input data stream is converted in parallel into low data rate bit streams in the converting unit 210. The low data rate bit streams are spread by a Walsh code in the modulation unit 220 to generate modulated signals. The modulated signals are added and then divided into two branches.

After one branch passes through the interleaver 241, it is multiplied to a gold code in the first multiplication unit 242. The interleaved signal can acquire time diversity gain and improve the performance of the entire system by reducing affection of noise. A signal from another branch is multiplied to a gold code in the second multiplication unit 243, and it is delayed in the delay unit 244 more than the time delayed by the interleaver 241.

Subsequently, a transmission antenna having the most appropriate channel is selected in the transmission unit based on downlink information. A signal that has passed through the interleaver 241 is transmitted through the transmission antenna first, and the time-delayed signal is transmitted to the same antenna. In short, a signal that has passed through the interleaver is transmitted first to reducing the time delay caused by the interleaving.

Limited power can be used efficiently by selecting a transmission antenna. Time diversity and reception diversity can be acquired by transmitting an interleaved signal and non-interleaved signal several times with a time interval. When the retransmission number is R, the transmission signal can be expressed as Equation 7:

$$s(t) = \sum_{k=1}^{K} \sqrt{\frac{2P}{R}} \, b'_k(t) W'_k(t) G_1(t) \cos(\omega_c t) +$$

$$\sum_{k=1}^{K} \sqrt{\frac{2P}{R}} \, b_k(t-\eta) W_k(t-\eta)$$

$$G_2(t-\eta) \cos(\omega_c(t-\eta))$$

Equation 7

$G_1$ and $G_2$ denote gold codes; $\eta$ denotes a predetermined time delay; and b'(t) denotes an interleaved data.

Since the transmission power is limited, it is divided by retransmission number and then transmitted. The first term in Equation 7 denotes a signal which is interleaved and transmitted directly, and the second term of Equation 7 denotes a signal which is transmitted not interleaved but time-delayed. When a channel the transmission signals pass through is expressed as $$h(t) = \sum_{l=1}^{L} \beta_l \delta(t-\tau_l) e^{j\gamma_l},$$

a signal received in the receiver is expressed as Equation 8:

$$y(t) = \sum_{l=1}^{L} \beta_l \left[ \sum_{k=1}^{K} \sqrt{\frac{2P}{R}} \, b'_k(t-\tau_l) W'_k(t-\tau_l) G_1(t-\tau_l) \right.$$

$$\cos(\omega_c t - \omega_c \tau_l + \gamma_l)] + \sum_{k=1}^{K} \sqrt{\frac{2P}{R}} \, b_k(t-\eta-\tau_l)$$

$$W_k(t-\eta-\tau_l) G_2(t-\eta-\tau_l) \cos(\omega_c(t-\eta) -$$

$$\omega_c \tau_l + \gamma_l)] + n(t)$$

Equation 8

$\beta_l$ denotes a channel coefficient; $\tau$ denotes a channel time delay; $\eta$ denotes a predetermined time delay; $G_1$ and $G_2$ denote gold codes; $\gamma_1$ denotes phase shift; L denotes the number of multi-paths; and n(t) denotes a white Gaussian noise having a double sided power spectral density.

Following is an analysis on the performance of the transmitter using interleaving delay diversity. Simulation parameters for obtaining bit error rate (BER) in diversity environments are obtained through computer simulation. The simulation parameters are shown as follows.

TABLE 1

| Modulation scheme | BPSK |
|---|---|
| Data rate | 0.48 Mbps (480 kbps) |
| Channelization code | Walsh Code |
| Scrambling code | Gold Code |
| Processing gain | 32 |
| Interleaving size | 1 time slot (0.125 ms. 60 bits. 1920 chips) |
| Interleaving technique | Block Interleaving (48 × 40) |

FIGS. 3A to 3H show results how retransmission, interleaving technique, and environment where an antenna selection technique is not used.

Figure 3A:
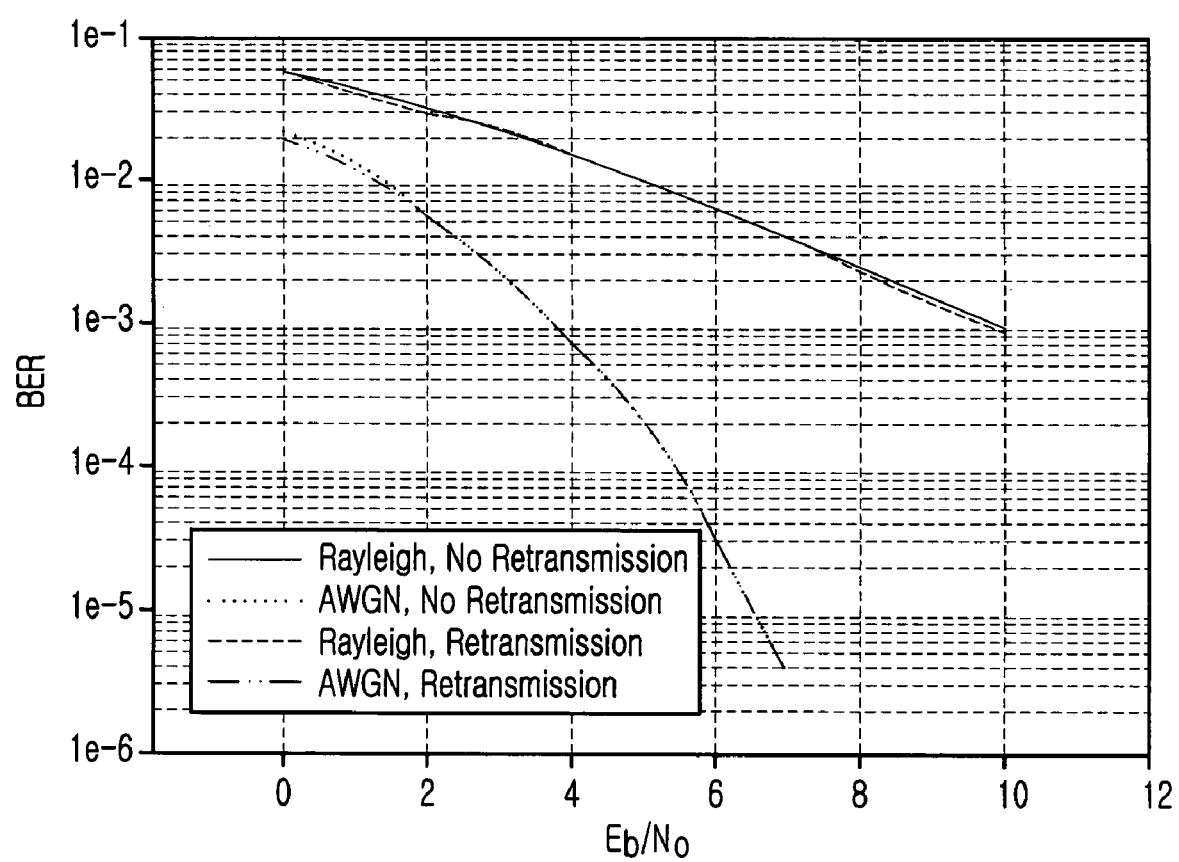

FIG. 3A is a graph comparing performances of the system when retransmission is performed or when no retransmission is performed. The retransmitted signal is not interleaved here. The graphs show a result that, even though the signal is retransmitted, no improvement is expected from the retransmission without any additional technique applied to the antenna.

Figure 3B:
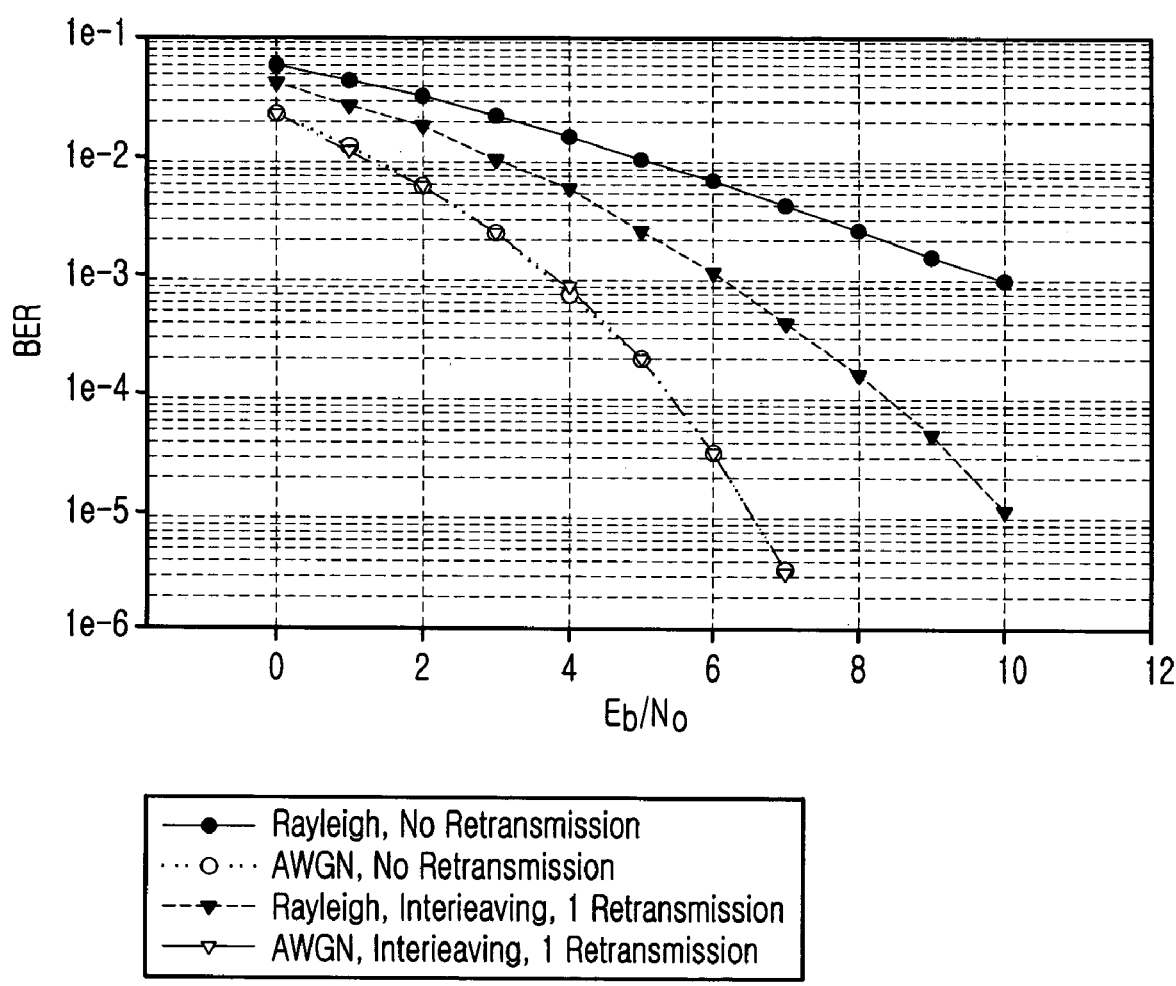
Figure 3C:
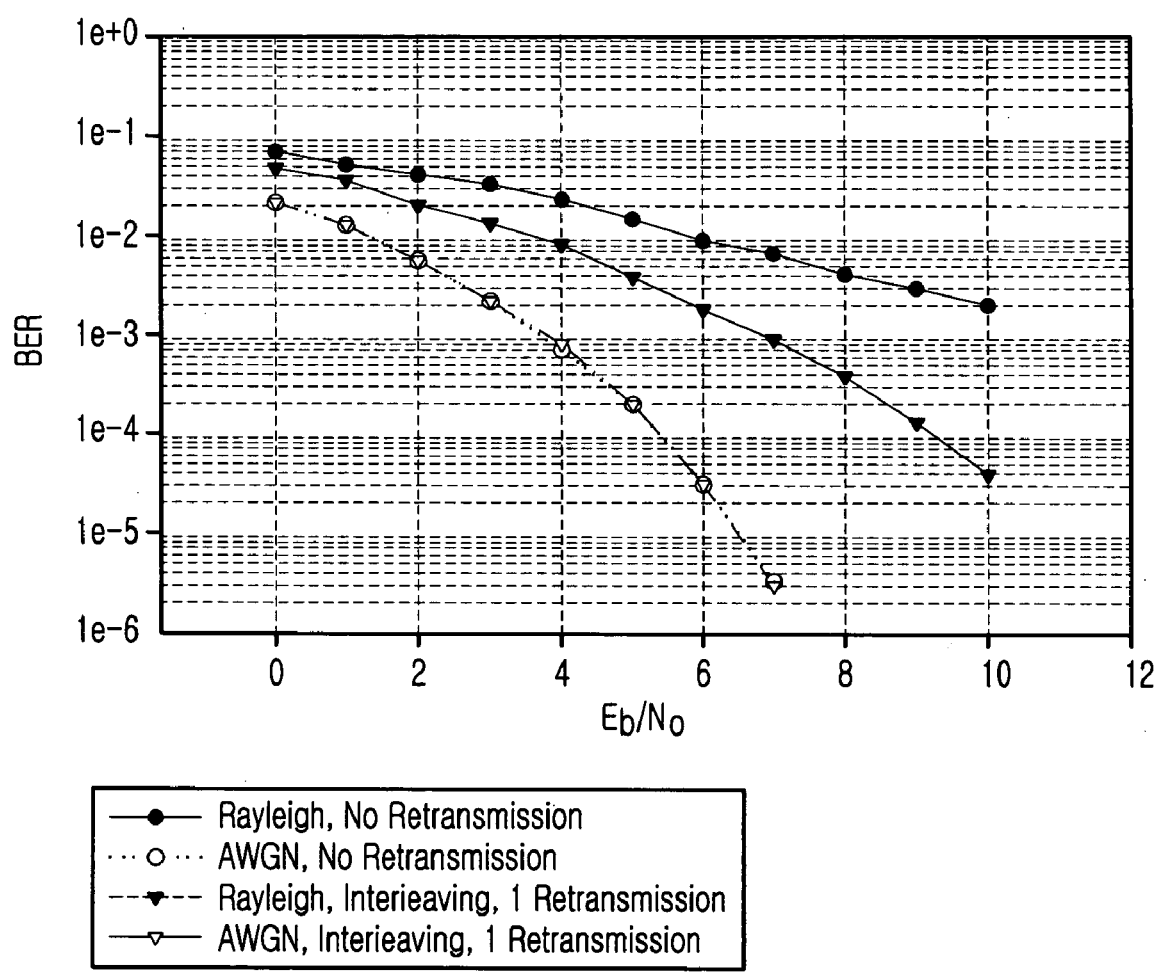

FIGS. 3B and 3C present a graph comparing performances of the system when a signal is retransmitted by performing interleaving or when the signal is not retransmitted in a slow fading environment and fast fading. The graphs show that the performance of the system is improved by about 4 dB in the fading channel environment when interleaving is performed during the retransmission. However, since the interleaving is performed for alleviating the effect from the fading channel environment, a system supporting only additive white Gaussian noise (AWGN) environment hardly shows improvement in its performance.

Referring to FIGS. 3B and 3C, the faster the fading becomes, the worse the system performance is. In this case, since the system supporting only the AWGN environment is not affected by the fading, there is no change in the system performance regardless of the fading speed.

Figure 3D:
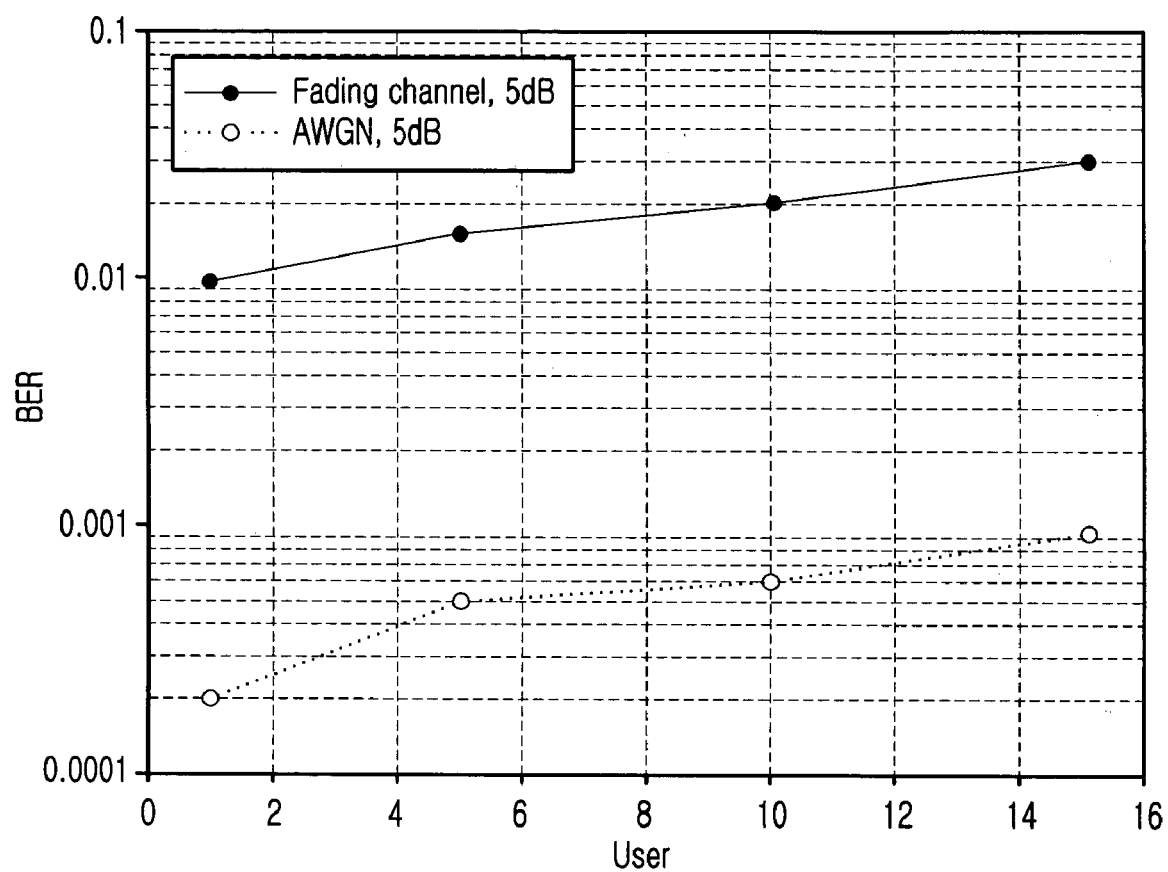

Referring to FIG. 3D, BER performance is analyzed according to increasing users in the system adopting both retransmission and interleaving. As the number of users is increased, more interference is generated between them, which leads to deteriorating performance.

Figure 3E:
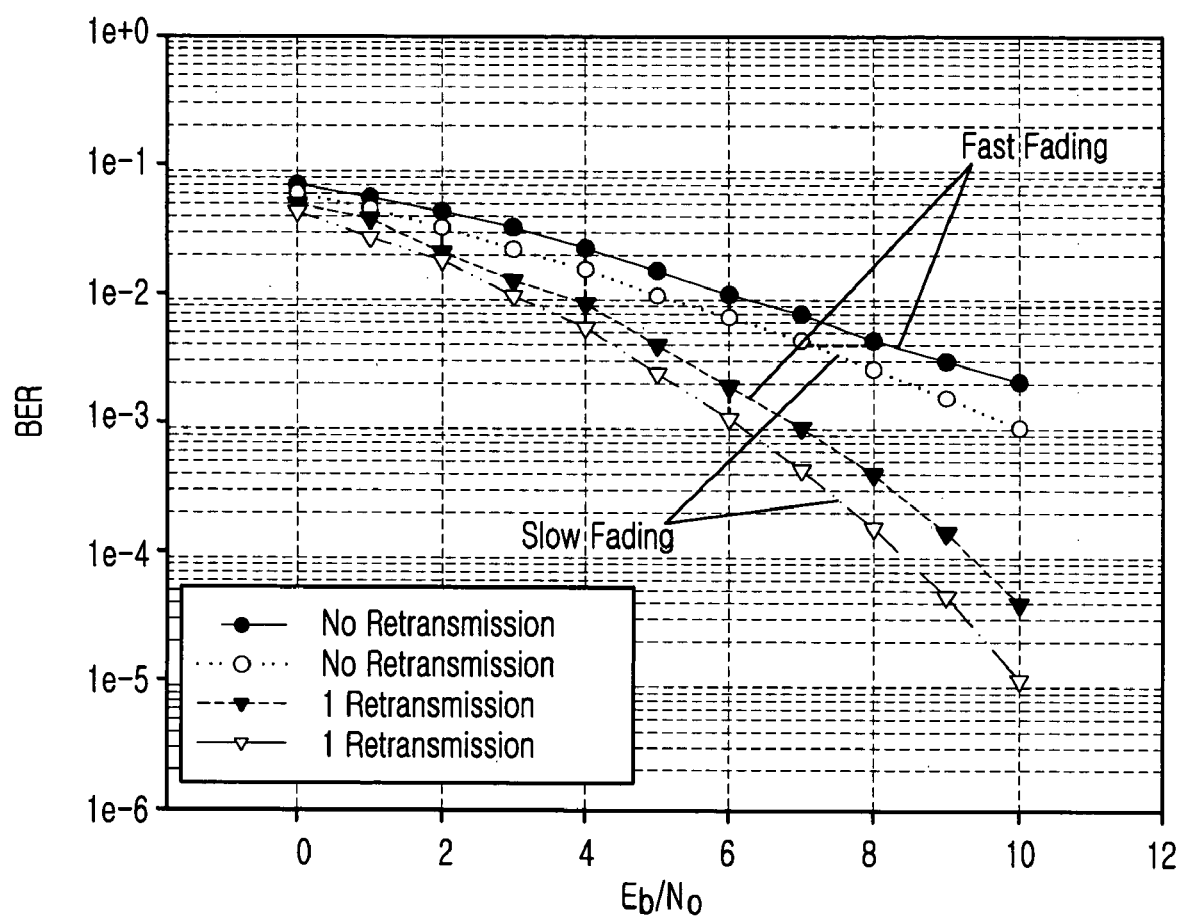

FIG. 3E is a graph obtained based on retransmission and fading speed. When the BER is $2 \times 10^{-3}$, the retransmission system not adopting an antenna selection technique shows degradation in the performance by 1 dB according to the fading speed. The retransmission system not adopting the antenna selection technique shows 1.5 dB of degradation in performance. Therefore, it can be seen from FIG. 3E that the retransmission system not adopting an antenna selection technique has less degraded performance in the fast fading environment.

Figure 3F:
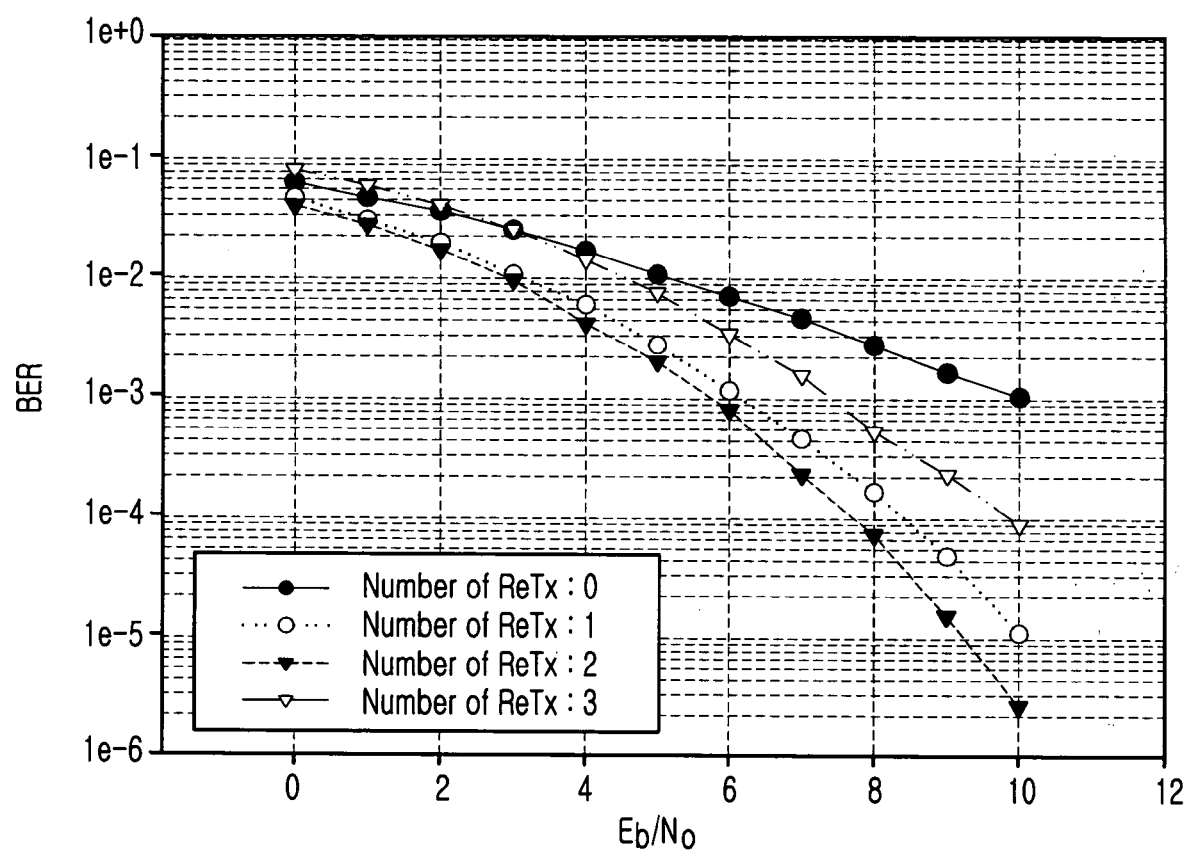

Referring to FIG. 3F, the performance of the system which does not adopting an antenna selection technique is analyzed according to retransmission number. As the retransmission number is increased from 0 to 2, the system performance is improved gradually.

On the other hand, the level of system performance improvement is not in proportion to the retransmission number. When the retransmission number is increased from 0 to 1, the level of system performance improvement is 4 dB, and when the retransmission number is increased from 1 to 2, the improvement level is 0.5 dB. Moreover, when the retransmission number is 3, the system performance becomes worse than a system that does not perform retransmission.

The system performance is not improved proportionally to increase the retransmission number. If the retransmission number is increased, the transmission power of the retransmission signal is rather decreased to thereby decrease the system performance.

Figure 3G:
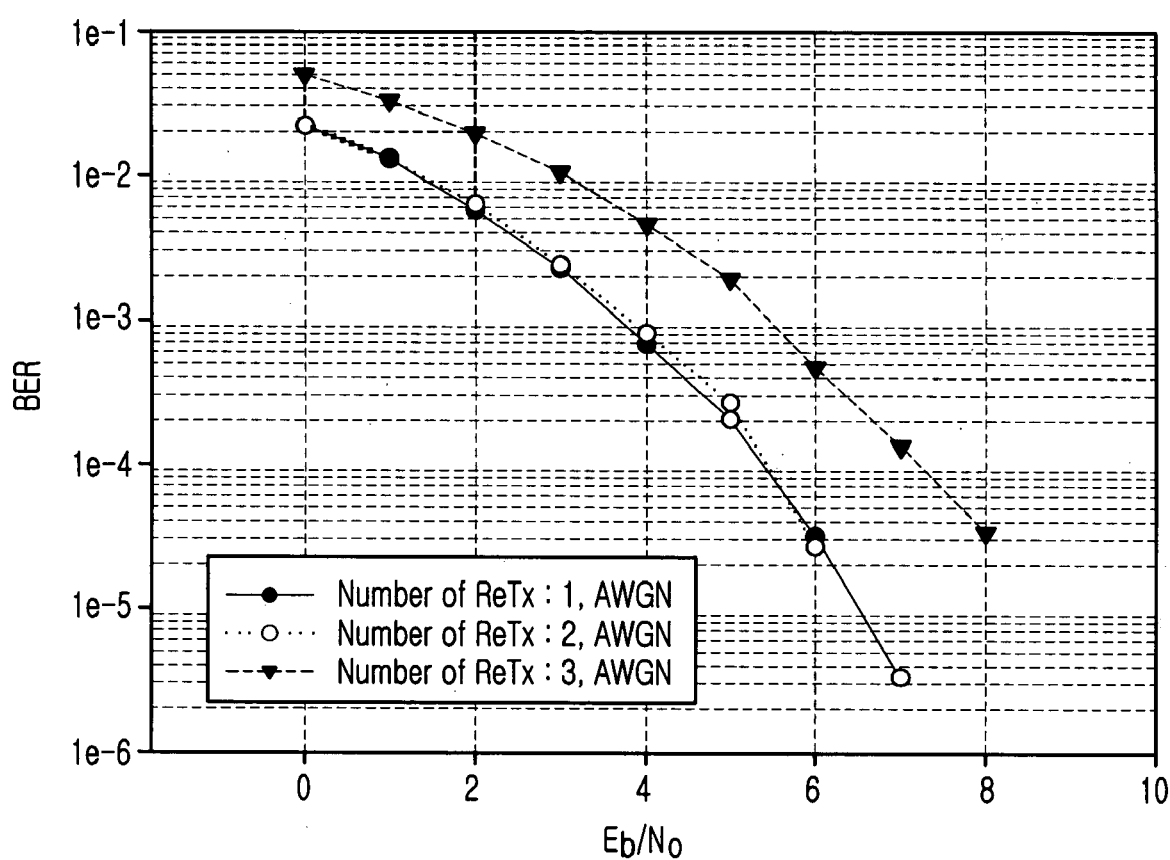

FIG. 3G shows an analysis on the performance of a system supporting only the AWGN environment under the same conditions as FIG. 3F. FIG. 3G shows that the system performance is decreased as the retransmission number is increased.

Figure 3H:
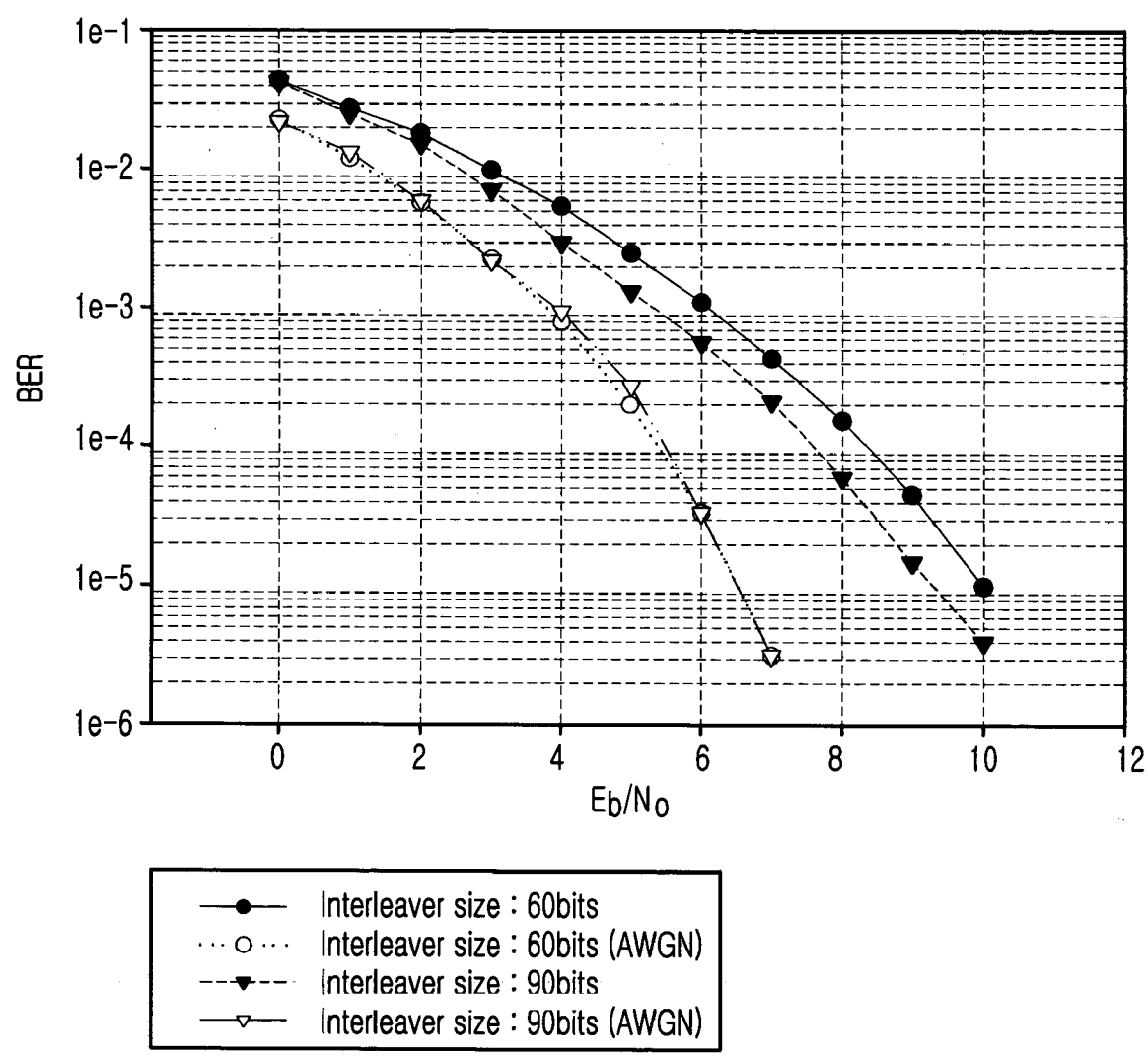
Figure 31:
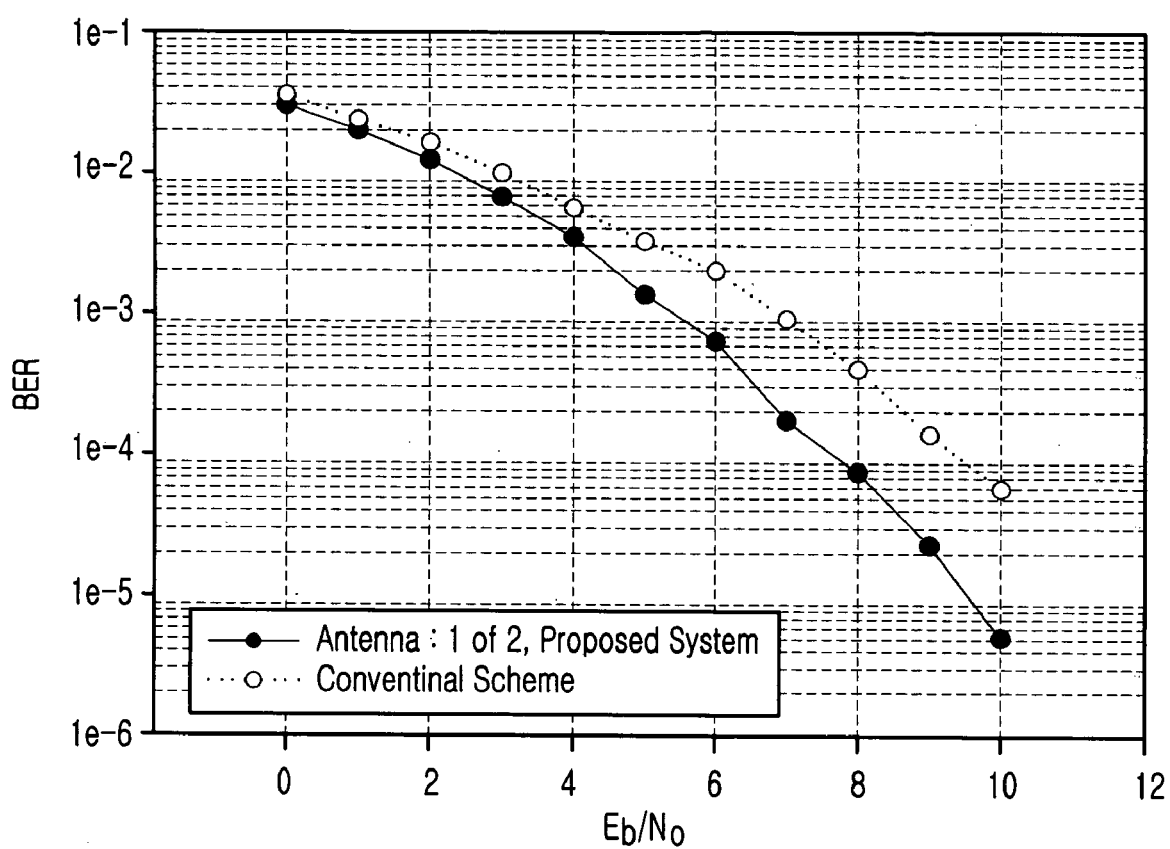

Referring to FIG. 3H, performance of the system not adopting an antenna selection technique according to the size of the interleaver 241. In the AWGN environment, the size of the interleaver 241 causes no change in the system performance. In the fading environment, however, the system performance is improved by 0.5 dB according to the increase in the size of the interleaver 241. The larger the interleaver 241 becomes, the longer time delay is. Therefore, some trade off should be made between the system performance and the size of the interleaver 241.

Referring to FIG. 3I, a method of transmitting a signal by selecting a transmission antenna having a more appropriate channel among two transmission antennas and a signal transmission method using all the two transmission antennas are compared in the respect of performance. The two methods consume the same transmission power, but the system adopting the antenna selection technique of the present invention brings improvement of about 2 dB in performance.

Figure 3J:
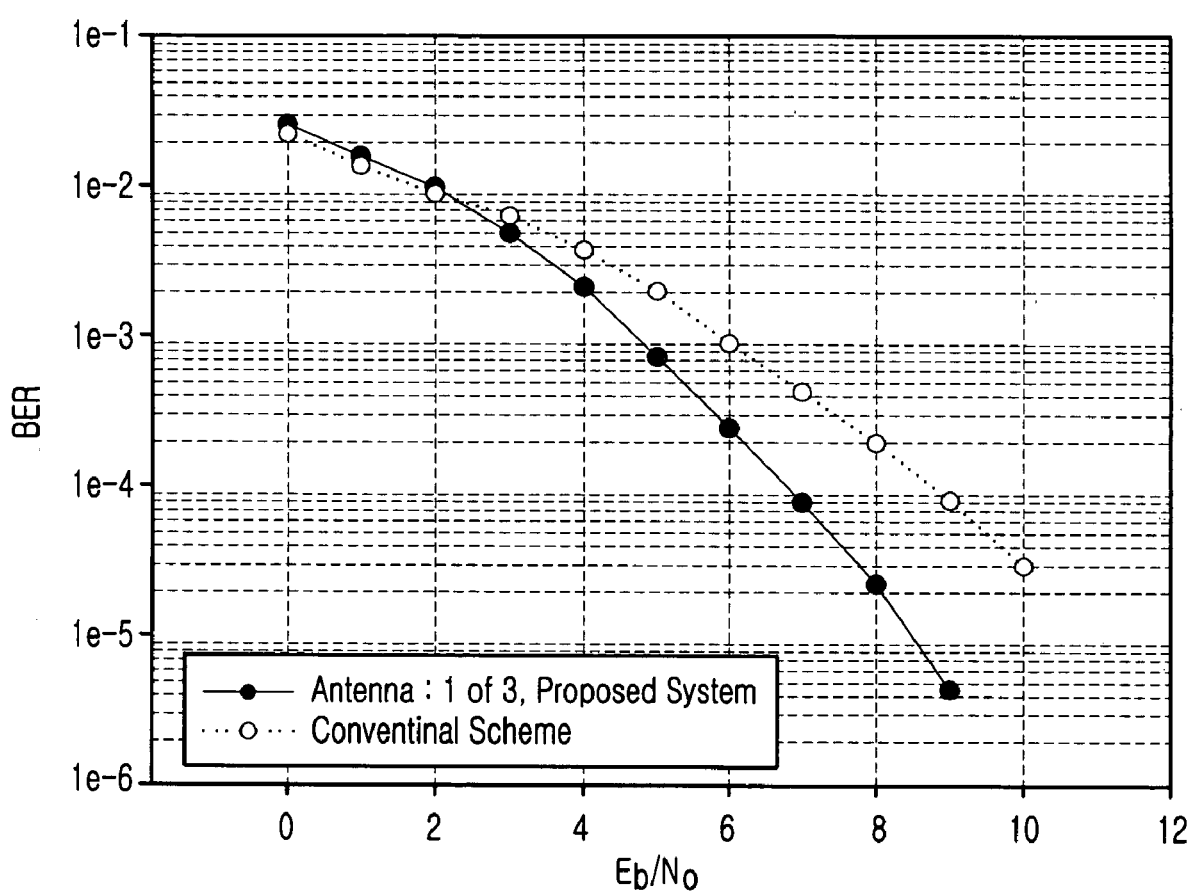

Referring to FIG. 3J, a scheme using an antenna selection technique and a scheme using no antenna selection technique are compared, when the total number of antennas is three. In the graph of FIG. 3J, a line marked as a conventional scheme is a conventional delay diversity.

The system of the present invention brings about improvement in the system performance 2 dB more than the conventional system.

Figure 3K:
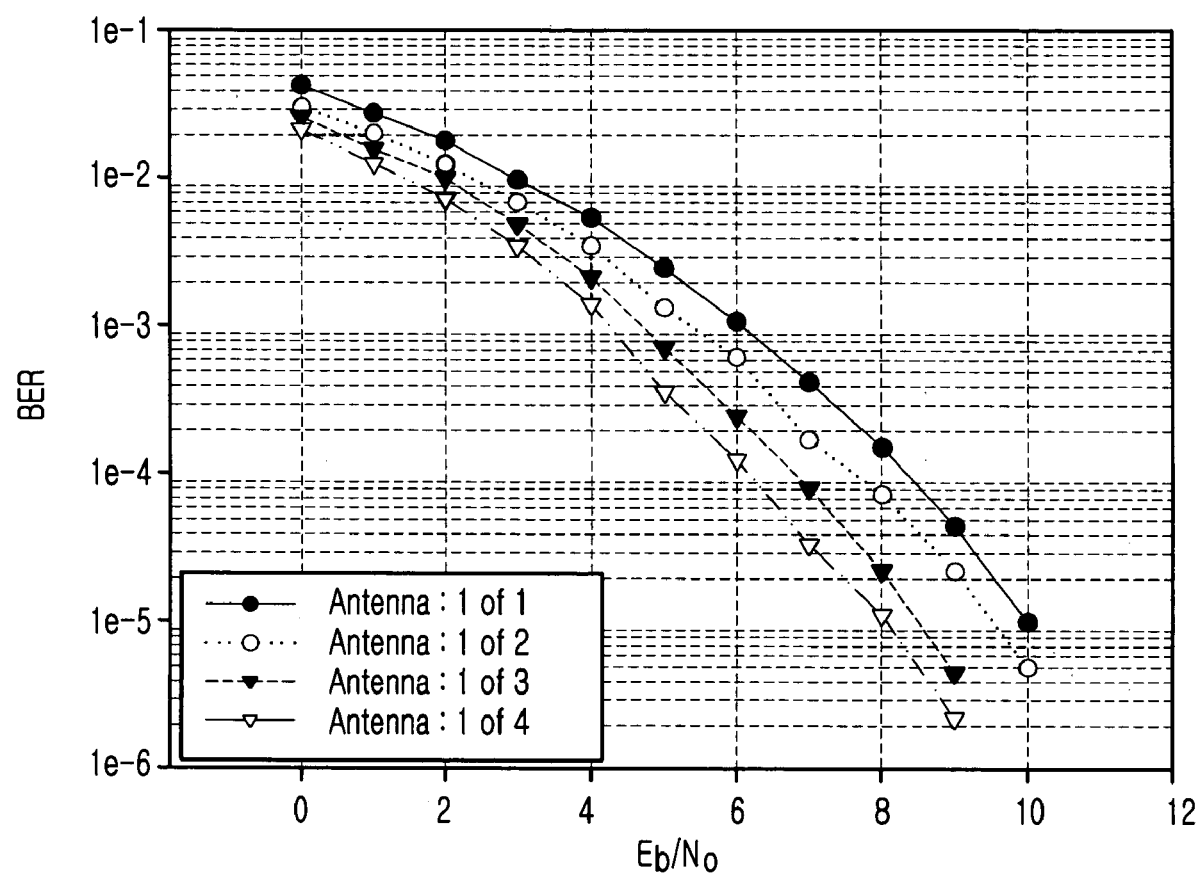

FIG. 3K is a graph showing performance of the system suggested in the present invention according to the total number of antennas. In the graph, the term "1 of 4" means that one antenna having the most appropriate channel environment is selected for signal transmission among four antennas. Although the actually used antenna is only one, the system performance is improved as the total number of antennas is increased. This is because the probability for selecting an antenna having a more appropriate channel becomes higher. The improvement in system performance becomes sluggish when the number of antennas is increased to a certain number.

Figure 3L:
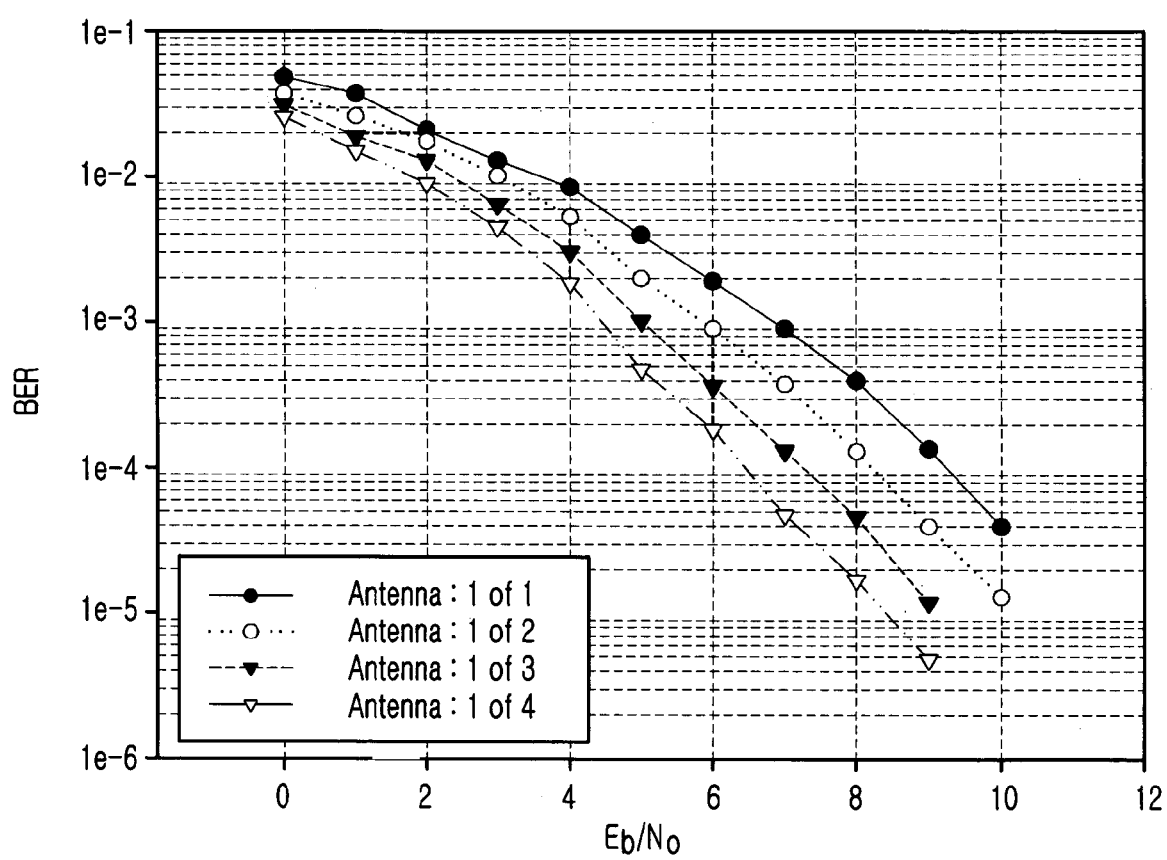
Figure 3M:
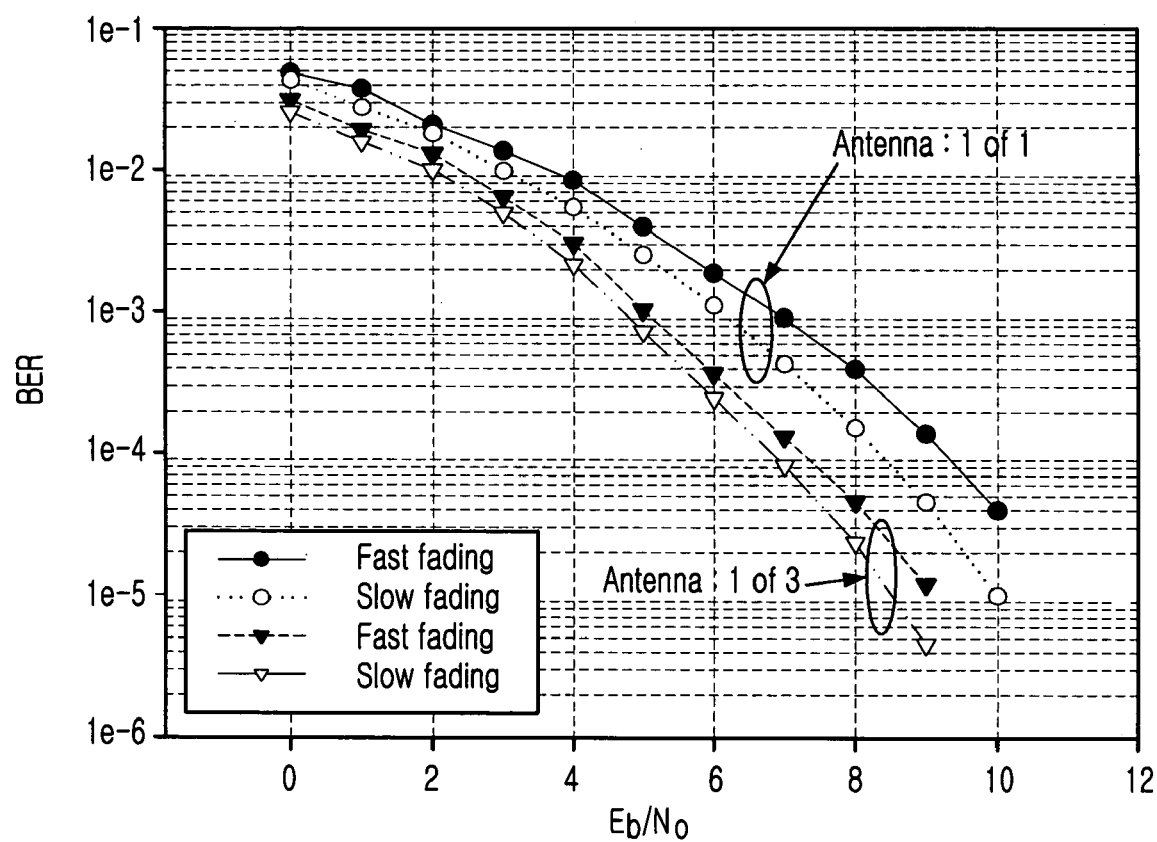

FIG. 3L describes the performance of the system proposed in the present invention when a signal passes through a fast fading channel in the environment of FIG. 3K. FIG. 3M is a graph showing the performances of the system suggested in the present invention according to the fading speed when the number of antennas is one and when the number of antennas is three. When there is only one antenna, the system performance is degraded by 1 dB as the fading rate becomes fast. When there are three antennas and the fading rate is fast, the system performance is degraded by 0.5 dB. From the results, it can be seen that the performance of the system transmitting a signal by selecting one among many antennas is less degraded by the fading speed.

The technology of the present invention can expand system capacity by applying the interleaving technique to the delay transmission diversity, improve quality of communication service, acquire reception diversity gain based on retransmission performed repeatedly in a transmission unit, and enhance communication efficiency by selecting an antenna having the most appropriate channel environment based on downlink information.

While the present invention has been described with respect to certain preferred embodiments, it will be apparent to those skilled in the art that various changes and modifications may be made without departing from the scope of the invention as defined in the following claims.

What is claimed is:

1. An apparatus for processing and transmitting a signal, the apparatus comprising:
    a splitter configured to split an input signal into two or more signals comprising a first signal and a second signal;
    an interleaver configured to interleave the first signal to provide a first interleaved signal;
    a first multiplier configured to multiply the first interleaved signal with a first code to provide a first coded signal;
    a second multiplier configured to multiply the second signal with a second code to provide a second coded signal;
    a transmission unit configured to transmit the first coded signal and the second coded signal; and
    a delay configured to delay the second coded signal to provide a time-delayed second coded signal, wherein the transmission unit is configured to transmit the time-delayed second coded signal in lieu of the second coded signal.

2. An apparatus for processing and transmitting a signal, the apparatus comprising:
    a splitter configured to split an input signal into two or more signals comprising a first signal and a second signal;
    an interleaver configured to interleave the first signal to provide a first interleaved signal;
    a first multiplier configured to multiply the first interleaved signal with a first code to provide a first coded signal;
    a second multiplier configured to multiply the second signal with a second code to provide a second coded signal; and
    a transmission unit configured to transmit the first coded signal and the second coded signal,
    wherein the two or more signals further comprise a third signal, wherein the apparatus further comprises a third multiplier configured to multiply the third signal to provide a third coded signal, and wherein the transmission unit is further configured to transmit the third coded signal.

3. The apparatus of claim 2, further comprising:
    a second delay configured to delay the second coded signal to provide a time-delayed second coded signal;
    a third delay configured to delay the third coded signal to provide a time-delayed third coded signal; and
    wherein the transmission unit is configured to transmit the time-delayed second and third coded signals in lieu of the second and third coded signals, respectively.

4. The apparatus of claim 3, wherein the second delay is configured to delay the second coded signal for a second delay period, wherein the third delay is configured to delay the third coded signal for a third delay period, and wherein the second and third delay periods are different from each other.

5. A method for processing and transmitting a signal, the method comprising:
    splitting an input signal into two or more signals comprising a first signal and a second signal;
    interleaving the first signal to provide a first interleaved signal;
    multiplying the first interleaved signal with a first code to provide a first coded signal;
    multiplying the second signal with a second code to provide a second coded signal;
    transmitting the first coded signal and the second coded signal; and
    delaying the second coded signal to provide a time-delayed second coded signal, wherein the time-delayed second coded signal is transmitted in lieu of the second coded signal.

6. A method for processing and transmitting a signal, the method comprising:

splitting an input signal into two or more signals comprising a first signal and a second signal;
interleaving the first signal to provide a first interleaved signal;
multiplying the first interleaved signal with a first code to provide a first coded signal;
multiplying the second signal with a second code to provide a second coded signal: and
transmitting the first coded signal and the second coded signal, wherein the two or more signals further comprise a third signal, wherein the method further comprises:
multiplying the third signal to provide a third coded signal; and
transmitting the third coded signal.

7. The method of claim 6, wherein the first second and third coded signals are transmitted through a single antenna.

8. The method of claim 6, wherein the first, second and third coded signals are transmitted through different antennas.

9. The method of claim 6, further comprising:
delaying the second coded signal for a second delay period to provide a time-delayed second coded signal;
delaying the third coded signal for a third delay period to provide a time-delayed third coded signal; and
wherein the time-delayed second and third coded signals are transmitted in lieu of the second and third coded signals, respectively.

10. The method of claim 9, wherein the second delay period and the third delay period are different from each other.

* * * * *